United States Patent [19]

Visser

[11] Patent Number: 4,890,748

[45] Date of Patent: Jan. 2, 1990

[54] PRODUCT DISPLAY AND TAKE-OUT CART

[76] Inventor: John G. Visser, 9703 W. Cuba Rd., Cuba, N.Y. 14727

[21] Appl. No.: 317,594

[22] Filed: Mar. 1, 1989

Related U.S. Application Data

[63] Continuation-in-part of Ser. No. 103,346, Oct. 1, 1987, abandoned.

[51] Int. Cl.⁴ .............................................. A47F 3/14
[52] U.S. Cl. ...................................... 211/133; 211/153
[58] Field of Search ............... 211/133, 153, 150, 126; 280/79.3; 108/6, 1

[56] References Cited

U.S. PATENT DOCUMENTS

| | | | |
|---|---|---|---|
| 3,743,105 | 7/1973 | David | 211/153 |
| 3,981,511 | 9/1976 | Foster | 211/150 X |
| 4,191,296 | 3/1980 | Morgan | 211/150 X |
| 4,496,037 | 1/1985 | Spamer | 211/153 X |
| 4,706,823 | 11/1987 | Visser | 211/133 |

Primary Examiner—Sarah A. Lechok
Attorney, Agent, or Firm—Frederick J. Olsson

[57] ABSTRACT

The cart has an upright, open frame, a plurality of trays arranged one over the other with an anti-bend pivot supporting and connecting each tray with the frame so as to be tiltable as between a horizontal product load position and an angled product take-out position with each tray being molded from fiberglass reinforced plastic including vertically oriented, beam-like sections, a full bottom, and a pair of metal rods molded with the tray and disposed on one side of the tilt axis and the fiberglass reinforced plastic, the vertical sections, the metal rods, and the pivot all cooperating to minimize tray flexure and the weight distribution provided by the tray structure and material on opposite sides of the pivot axis causing the tray to tilt to the product load position when the tray is not carrying products and causing the tray to tilt to the product take-out position when the tray is filled with products.

17 Claims, 5 Drawing Sheets

PRODUCT DISPLAY AND TAKE-OUT CART

This application is a continuation-in-part of my copending application Ser. No. 103,346 filed 10/1/87, now abandoned.

This invention relates to retail store point-of-sale display carts having trays which, at a remote point, are loaded with rows of identical products, brought to the store and then placed in a location wherein a customer can view and remove a product from the first row with the removed product then being immediately replaced by a product in the next adjacent row sliding down to fill the space.

In one aspect the invention contemplates a cart of the kind in question having an upright, open frame, a plurality of trays arranged one over the other with anti-ben pivot means supporting and connecting each tray with the frame so as to be tiltable as between a horizontal product load position and an angled product take-out position with each tray being molded from fiberglass reinforced plastic including vertically oriented, beam-like sections, a full bottom, and a pair of metal rods molded with the tray and disposed on one side of the tilt axis and the fiberglass reinforced plastic, the vertical sections, the metal rods, and the pivot means all cooperating to minimize tray flexure and the weight distribution provided by the tray structure and material on opposite sides of the pivot axis causing the tray to tilt to the product load position when the tray is not carrying products and causing the tray to tilt to the product take-out position when the tray is filled with products.

In another aspect the invention contemplates a cart of the kind in question having an upright, open frame, a plurality of trays arranged one over the other with anti-bend pivot means supporting and connecting each tray with the frame so the tray is tiltable as between a horizontal product load position and an angled product take-out position with each tray being molded from fiberglass reinforced plastic with vertically extending front and side walls and a full bottom, the underside of the bottom having vertical ribs extending front to back and side to side, and a pair of the vertical ribs on one side of the tilt axis each having a metal rod molded therewith to provide weight means and the fiberglass reinforced plastic, the vertical rib and wall structure, the pivot means, and the metal rods all cooperating to minimize tray flexure and the weight distribution provided by the tray structure, and material on opposite sides of the tilt axis causing the tray to tilt to the product load position when the tray is not carrying products and causing the tray to tilt to the product take-out position when the tray is filled with products.

In another aspect the invention contemplates a cart of the kind in question having an upright, open frame, a plurality of trays arranged one over the other with pivot means supporting and connecting each tray with the frame so as to be tiltable as between a horizontal product load position and an angled product take-out position with each tray being molded from fiberglass reinforced plastic having vertically extending front and side walls and a full bottom, the underside of the bottom having vertical ribs extending front to back and side to side and cooperating with the vertical front and side walls to provide a structure minimizing tray flexure.

In another aspect, the invention contemplates a cart of the kind in question having an upright, open frame, a plurality of trays arranged one over the other with pivot means supporting and connecting each tray with the frame so as to be tiltable as between a product load position and a product take-out position with each tray being molded from fiberglass reinforced plastic having vertically extending front and side walls and a full bottom, the underside of the bottom having vertical ribs extending front to back and side to side and the pivot means extending side to side across the tray and having an anti-bend structure, the tray structure and material and the pivot means cooperating to provide a tray with minimum flexure.

In another aspect the invention contemplates a cart of the kind in question having an upright, open frame, a plurality of trays arranged one over the other with pivot means supporting and connecting each tray with the frame so as to be tiltable as between a horizontal product load position and an angled product take-out position with each tray being molded from fiberglass reinforced plastic having vertically extending front and side walls and a full bottom, a groove or liquid-collecting gutter adjacent the foot of the front wall and with drainage holes at the opposite ends thereof, the full bottom and drainage means arrangement lending special utility for liquid-carrying containers subject to leakage or condensation to prevent liquid in one tray from dripping on the containers in the lower tray.

In another aspect, the invention contemplates a cart of the kind in question having an upright, open frame, a plurality of trays arranged one over the other with pivot means supporting and connecting each tray with the frame so as to be tiltable as between a product load position and a product take-out position with each tray being molded from fiberglass reinforced plastic having a front wall and full bottom, the top of which has product slides in the form of small beads which extend from the back of the tray toward the front, each terminating so as to leave a flat space adjacent the front wall, the front wall establishing the line in which products are seen, removed, and replaced.

In another aspect the invention contemplates a cart of the kind in question having an upright, open frame, a plurality of trays arranged one over the other with pivot means supporting and connecting each tray with the frame so as to be tiltable as between a horizontal product load position and an angled product take-out position with each tray being molded from fiberglass reinforced plastic having a front wall and a full bottom, the top of which has product slides in the form of small beads which extend from the back of the tray toward the front each terminating so as to leave a flat space adjacent the front wall, the latter establishing the line in which products are seen, removed, and replaced and the front wall having an upper lip which acts to minimize outward flexing of the front wall.

The invention will be described below in connection with the following drawings wherein.

The invention is illustrated herein as applied to a dairy or milk cart. It will be understood, however, that the invention finds like utility for various other beverages and for dry-type food products.

Figure 1:
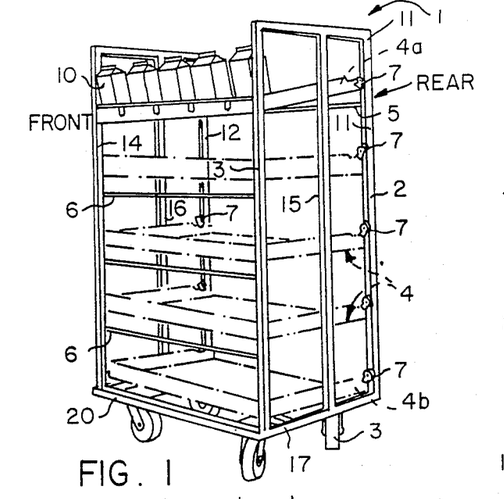
FIG. 1 is a perspective view of a milk cart incorporating the improvements of the invention.

In FIG. 1, the point-of-sale display cart 1 has a frame 2, mounted on wheels 3 and carrying a plurality of trays 4. The trays are pivotally connected to the frame 2 for tilting motion between a product load position and a product take-out position. The front and rear of the cart are noted.

The topmost tray 4a is shown in a product take-out position. In this position the tray is oriented at an angle to the horizontal. Each of the trays underneath tray 4a are shown in a product-load position. In the product-load position the tray is oriented substantially horizontally.

The product load position of a tray is determined by the tray engaging rear bars on the frame. The rear bar for the top tray 4a is indicated at 5. The product take-out position of a tray is determined by engagement with a front bar with some of the same being indicated at 6.

In the product load position, a tray is releasably held by a pair of latches 7. After loading, the latches can be activated to release a tray and the same tilts down to the product take-out position.

For loading the tray the same is placed in the product load position and milk cartons are pushed into the tray from the rear until a row fills up the front as shown for the cartons 10. Additional rows are set up behind the first row until the tray is filled. The cart is then wheeled onto a delivery truck and delivered to the retail store such as a supermarket, unloaded, and pushed into a refrigerated display case where the front of the cart can be seen by the customer.

The customer desiring to examine or purchase an item can reach in the case and remove a carton. After removal, gravity will cause the carton in the next row to slide down and assume a first row position.

The manner in which the foregoing is accomplished will be apparent from the detailed description which follows.

Figure 2:
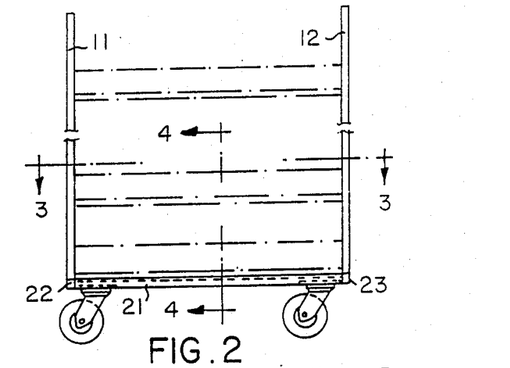
FIG. 2 is an elevational view looking at the rear of the cart of FIG. 1.

The frame 2 has a pair of upright rear standards 11 and 12, a pair of upright front standards 13 and 14, a pair of intermediate standards 15 and 16 all welded to a base 17 on which are mounted the wheels 3.

Figure 3:
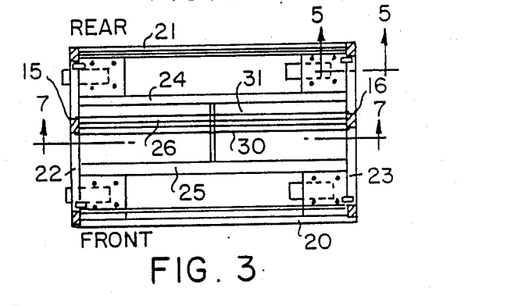
FIG. 3 is a view taken along the lines 3—3 in FIG. 2.

The base 17 (FIG. 3) includes the front and rear pieces 20 and 21, side pieces 22 and 23, and intermediate pieces 24 and 25.

The rear bars 5 are welded to the rear standards 11 and 12 and the front bars 6 are welded to the front standards 13 and 14.

Figures 5, 6, 8:
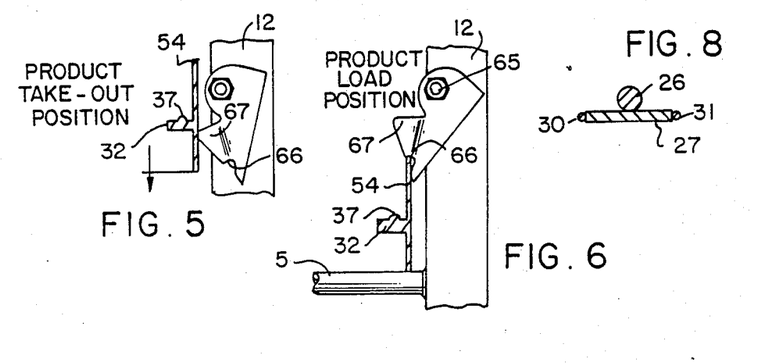
FIG. 5 is an enlarged fragmentary view taken along the lines 5—5 of FIG. 3.
FIG. 6 is a view similar to FIG. 5 showing components in a different position.
FIG. 8 is a sectional view taken along the lines 8—8 of FIG. 7.

The structure of the pivot means for each of these trays except the bottom tray 4b are all identical and this structure will now be explained in connection with FIGS. 7 and 8.

The pivot rod 26 extends between and is welded to the intermediate standards 15 and 16. The rod is formed with a curvature which is concave in the downward direction. The degree of curvature is approximately ⅜-inch from center for a three-foot,½-inch diameter rod. A rectangular strip 27 (FIG. 8) is on the underside of the rod 26. The strip is welded to the intermediate standards 15 and 16 and also welded to the pivot rod 26 at several evenly spaced locations. On opposite sides of the strip 27 are tension rods 30 and 31. The opposite end of each rod is welded to the intermediate uprights 15 and 16 and welded to the strip 27 about midway between the standards 15 and 16.

The purpose of the curvature on the rod 26 and strip 27 is to counter any sag or flexture in the tray due to the weight of the products.

The purpose of the tension rods 30 and 31 is to restrain the intermediate standards 15 and 16 from bending and, thus, maintain the curvature in rod 26. The purpose of strip 27 is to control lateral flexing of the rod due to curvature.

The structure of the tray will now be described in connection with FIGS. 9 through 16.

The tray is designed so that the same can be molded from reinforced fiberglass plastic with vertically oriented sections, the sections all cooperating to provide high resistance against flexture with minimal weight to strength ratio. I have successfully made trays of the kind in question using a polyester (thermosetting resin) with chopped fiberglass in a single cavity mold.

Figure 9:
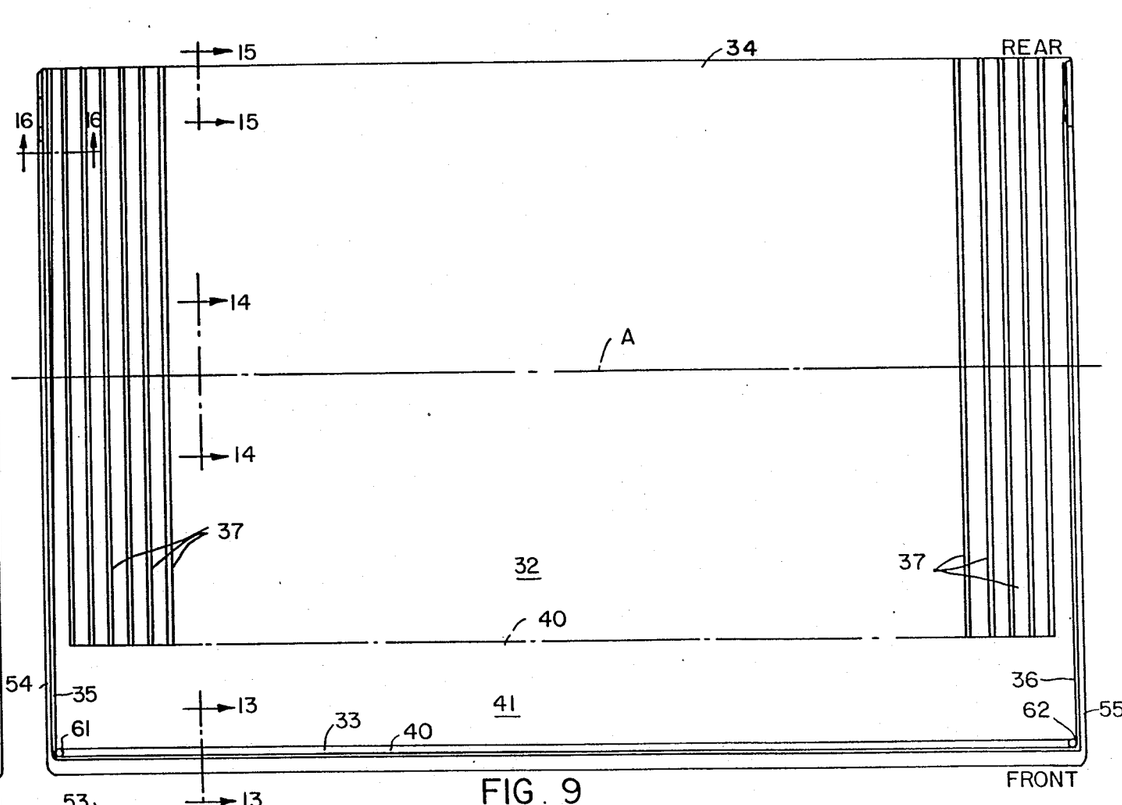
FIG. 9 is a top plan view of a tray used in the cart of FIG. 1.
Figure 10:
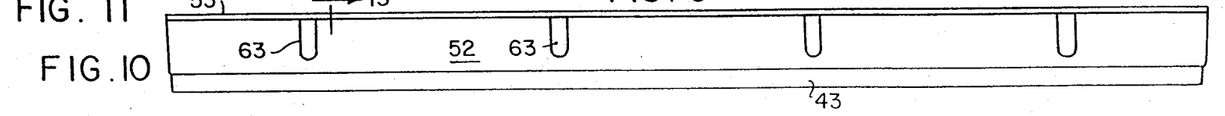
FIG. 10 is a front elevational view of the tray of FIG. 9.

The tray has a generally flat bottom 32 with a front edge 33, a rear edge 34, and side edges 35 and 36.

The top side of the bottom 32 has a plurality of beads 37 which extend from the rear edge 34 toward the front edge 33. In FIG. 9 only the groups of beads adjacent the side edges 35 and 36 are illustrated. It will be understood that there are identical beads between the two groups. Each bead terminates at a point spaced inwardly from the front edge along a common line indicated at 40. This leaves the surface 41 between the front edge 33 and the line 40 in smooth condition, the purpose for which will be commented on later.

Figures 12, 13, 14, 15, 16:
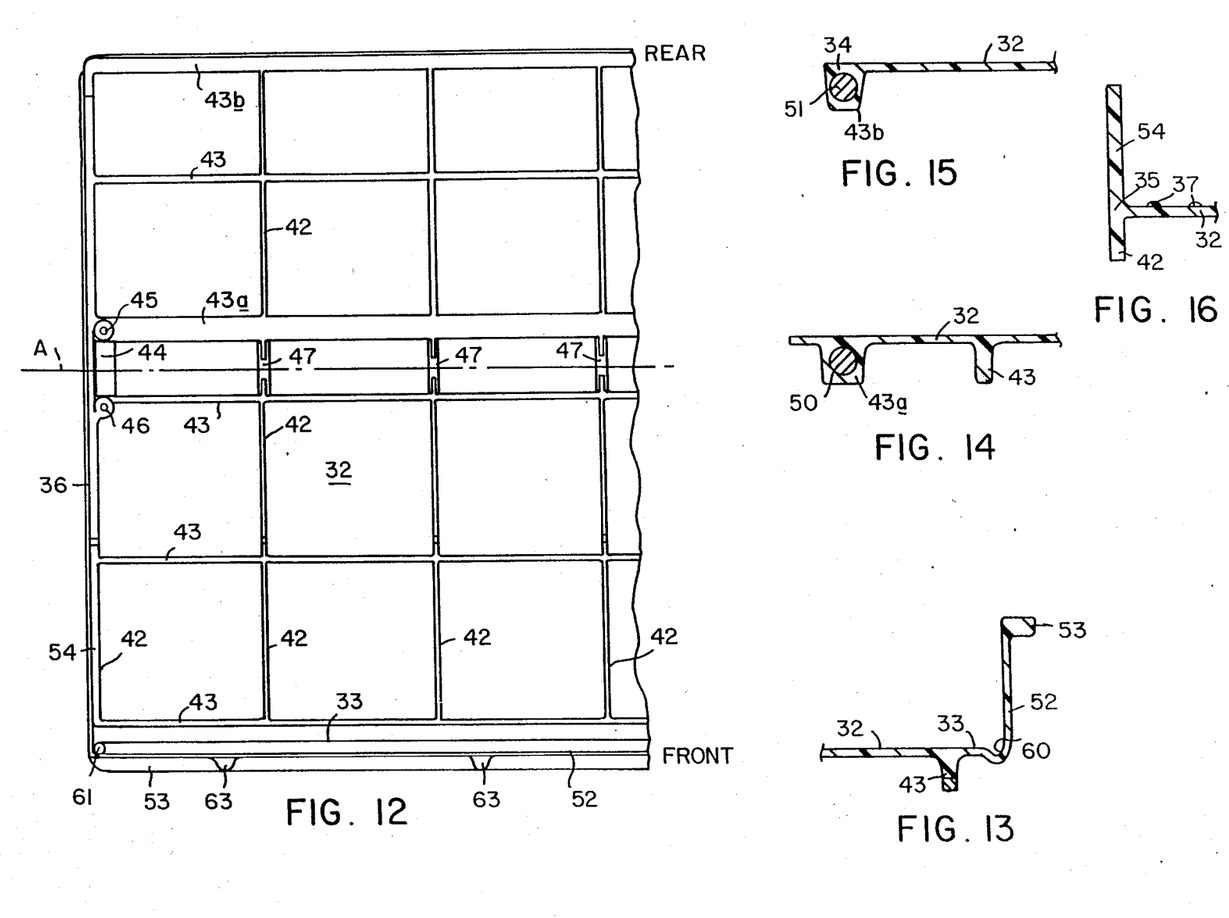
FIG. 12 is a bottom view of the left-hand side of the tray of FIG. 9.
FIG. 13 is an enlarged elevational sectional view showing the tray cross section taken along the lines 13—13 of FIG. 9.
FIG. 14 is an enlarged elevational sectional view showing the tray cross-section taken along the lines 14—14 of FIG. 9.
FIG. 15 is an enlarged elevational sectional view showing the tray cross-section taken along the lines 15—15 of FIG. 9.
FIG. 16 is an enlarged sectional view showing the tray cross-section taken along the lines 16—16 of FIG. 9.

Referring to FIG. 12, the underside of the bottom 32 has a frist set of vertical ribs 42 which extend between the front and rear edges 33 and 34 and a second set of vertical ribs 43 which extend between the side edges 35 and 36, the later set including the thickened vertical ribs 43a and 43b.

The ribs of the first and second sets intersect one another as shown to form an integrated grid and the ribs 42 and 43 are relatively thin (except the ribs 43a and 43b), but of substantial vertical height to provide a structure to minimize flexing under product load.

As noted previously, the pivot structure of the tray includes the pivot rod 26. The ribs 42 are formed with support means to engage the rod 26 so the tray is supported by and tiltable on the rod.

Figure 11:
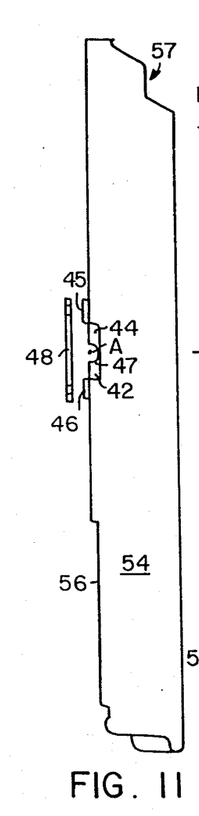
FIG. 11 is a side elevational view of the tray of FIG. 9.

The ribs 42 of the first set which are adjacent the side edges have material which forms a flat surface, the flat support surface adjacent the edge 36 being indicated at 44 in FIGS. 11 and 12. The end of the rib 43a and the end of the rib indicated at 43c are formed with platforms 45 and 46 adjacent the surface 44. An identical surface and platforms respectively coplanar with the surface 44 and platforms 45 and 46 are adjacent the opposite end of side edge 36. The ribs 42 between the side edge ribs are provided with semi-circular cuts 47. From an inspection of FIGS. 2 and 11 it will be apparent that the semi-circular cut-outs are aligned with one another in a direction from side edge to side edge and that the innermost point in the cut-outs lie in a plane containing the support surfaces.

The length of the pivot rods 26 is commensurate with the width of the tray between the side edges so that the tray can be placed down in a pivot rod with the support surface bearing on the ends of the rod and the cut-outs also bearing on the pivot rod, taking into account the slight curvature in the pivot rod as mentioned above.

The dimensions are such that when the tray is down in the rod and engaged with the support surfaces, the plane containing the support surface is tangent to the rod.

When the tray is in place, it is retained by retaining straps which are mounted on the platform. See for example the retaining strap 48 in FIG. 11. The strip is held fixed against the platforms 45 and 46 by screws not shown and acts to hold the support surface against the end of the pivot rod in a snug, sliding fit.

Thus, the tray is adapted to tilt about the tilt axis A. The tilting feature with respect to the tray structure will be commented on shortly.

With reference to FIGS. 14 and 15, the ribs 43a and 43b have been molded with inserts or metal rods 50 and 51. These rods provide weight means on the rear side of the tray (for purposes explained later) and in addition provide a composite structure which enhances the ability of the tray to withstand flexure due to product loads.

On the front edge 33 of the tray is a vertical front wall 52 having a forwardly extending lip 53. On the side edges 35 and 36 are vertically extending product retaining side walls 54 and 55 which are of substantial vertical height to minimize tray flexure. With reference to FIG. 16, note that the wall 54 is in vertical alignment with the rib 42 next to side edge 35 which enhances vertical strength. Wall 55 is similarly arranged. The purpose of lip 53 is to prevent the front wall from flexing when products bear on same.

With reference to FIG. 11 it will be noted that wall 54 is contoured at 56. This is simply for clearance purposes for the bottom most tray. Also the wall 54 is contoured at 57. This is for engaging the latch means as explained later.

The flat, full bottom employed in the tray is important because it enhances the anti-flex characteristic of the tray. Also, when the tray is used to store milk cartons or other liquid carrying containers which can be subject to leakage or condensation, the full bottom prevents liquid in one tray from dripping onto the containers in the tray below. To dispose of any such leakage, it will be seen that the bottom-most part of the front wall 52 (FIG. 13) is formed with a groove or drainage gutter 60 which is coextensive with the front wall. At the opposite ends of the groove are drainage holes 61 and 62. These holes have their exits on the outside of the tray and leakage from one hole will pass by the lower trays and onto the floor.

The outside surface of the front wall 52 has a plurality of bosses 63. These add strength to the front wall and in addition may be employed as supports for mounting a grid or barrier frame on the front wall to extend above the lip 53 where very tall packages are supported in the tray. The grid or barrier frame prevents such packages from falling forward. This feature will be commented on later in connection with FIG. 19.

From the above description, it will have been noted that the area above the rear edge 34 is clear and this provides for the packages to be displayed to be easily loaded. During transportation from the packaging center to the retail store, the trays are tilted into the product take-out position so there is no need for a product retaining wall.

The purpose of the beads 37 is to enhance the ability of the products stored in the tray to slide toward the front wall. The purpose of the smooth area 41 adjacent the front wall is to brake or reduce the speed with which the product slides down to replace a product removed by a customer.

Figure 4:
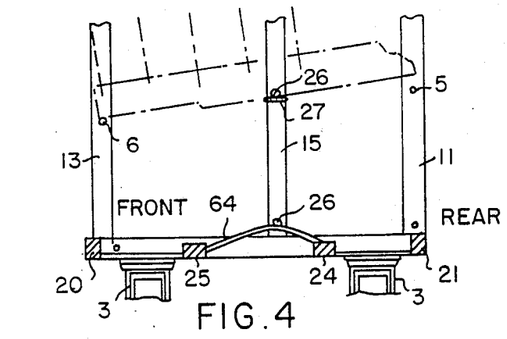
FIG. 4 is a view taken along the lines 4—4 in FIG. 2.

The bottom most tray 4b has a different arrangement for maintaining the curvature in its pivot rod 26. As shown in FIG. 4, this comprises a support rod 64 which has a curvature concave in the downward direction with the top of the support rod engaging the underside of the pivot rod and the opposite ends engaging the intermediate pieces 24 and 25. The support rod is welded to the pivot rod and to the intermediate pieces.

The manner in which the latches 7 operate will be explained in connection with FIGS. 5 and 6. There is a latch for each side of a tray, the latch on one side being the mirror image of the latch on the other side. Therefore, an explanation with respect to the latch shown in FIGS. 5 and 6 will suffice.

The latch is pivotally connected to the rear standard 12 as by pivot 65 and includes a keeper section 66 and an abutment section 67. The configuration provides a weight distribution so that the latch (if free) will swing clockwise into the path of the tray tilting motion. Thus, when the tray is in the take-out position the latch swings so that the abutment section 67 engages the outer surface of the side wall 54 as shown in FIG. 5. When the tray is moved from the product take-out position to the product-load position, the abutment section 67 will follow the top of wall 54 until the tray engages the rear bar 5 and the keeper 66 is positioned over the top edge of the wall 54. The keeper prevents the tray from tilting back to the product take-out position.

The tray will remain locked (by both latches) until the latches are rotated counterclockwise and the keeper sections disengage from the top edges of the side walls. Normally, the release is effected by a product being loaded in the last row engaging the abutment 67. If the product package is not suited for this purpose, the loading personnel can simply push each latch counterclockwise by hand.

The tray structure as described above is adapted to provide for the tilting from the product load position to the product take-out position by weight distribution as explained following.

It will be observed that the tilt axis A is off-set in, that is to say, it is closer to the rear edge 34 than the front edge 35. With reference to FIGS. 9 and 12 it will be observed that in plan the tray from side wall to side wall is substantially symmetrical. However, in plan, in a direction front to rear, there is a greater mass of material (including the bottom 32, the ribs 42 and 43, and the side walls 35 and 36 and the presence of front wall 52 and the absence of a rear wall) on the area between the front edge 33 and the axis A than in the area between the rear edge 34 and the axis A.

Thus, it will be apparent that more products can be stored on the bottom 32 between the axis A and from wall 52 than in the area between the axis A and rear edge 34. In summary, there is more weight of reinforced plastic on the front side of axis A than on the rear side of axis A and more product can be loaded on the front side.

Therefore, with the off-set condition of the axis A and more reinforced plastic material on the front side, the tray will normally tilt from the horizontal down to the product take-out position. The tray will tilt with a considerable amount of force and this is especially true when loaded and considerable jarring could result. The steel rods embedded in the ribs 43a and 43b provide a counterbalancing effect so that the tray will tilt both under the load and no-load condition without undesirable rapid motion and jarring.

Figure 17:
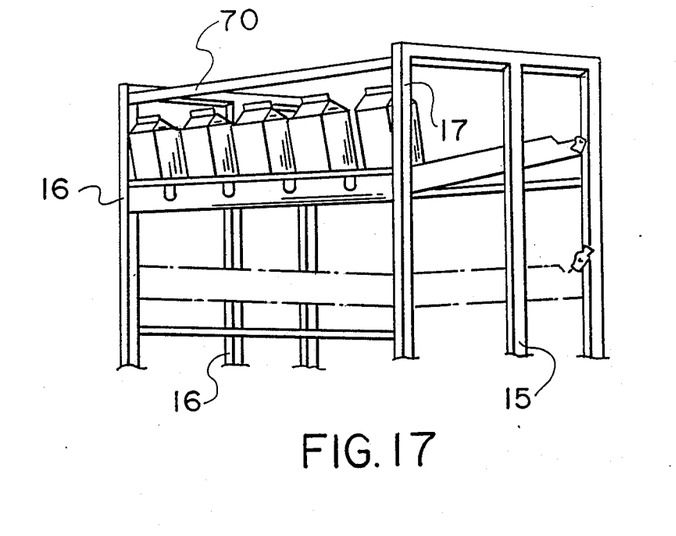
FIG. 17 is a fragmentary perspective view of the top of my cart illustrating a safety bar.
Figure 18:
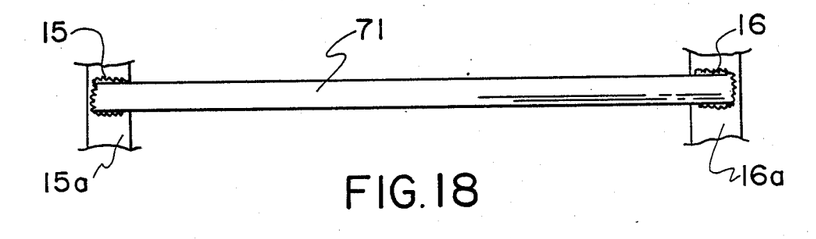
FIG. 18 is a fragmentary view illustrating a modified pivot means.

In FIGS. 17 and 18 I have illustrated two modifications which will now be discussed.

As noted heretofore, the carts are loaded with cartons at the dairy and then wheeled into a truck for delivery to the retail outlet. In most instances, the carts are loaded one behind the other with the front of each cart facing the front of the truck. With such loading, I have found that during transportation, adjacent carts tend to shift laterally. Thus, the front standards of one cart and the rear standards of the adjacent cart are also shifted laterally.

In going over bumps, rough roads, or with sudden stops, the carts may tilt so that the rear standards of one cart and the top tray of the adjacent rear cart collide. In some instances the engagement can be so severe that the tray is damaged.

To avoid the foregoing, I have included the safety bar 70 which extends between the front standards 16 and 17 just below the tops thereof. If a cart tilts forward or rearward, the rear standards of one cart and the bar 70 of the next adjacent cart will engage. This prevents contact between the top tray and the rear standards. The bar 70 is welded in place.

Figure 7:
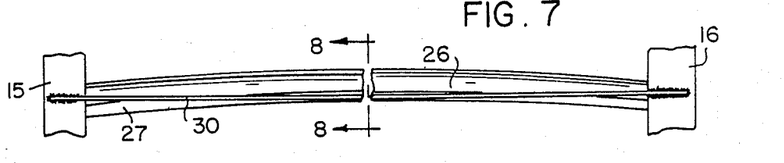
FIG. 7 is an enlarged view taken along the lines 7—7 of FIG. 3.

In FIG. 18 I have shown a modification of the pivot means arrangement shown in FIG. 7. It will be evident that the bent pivot rod 26, the strip 27, and the tension rods 30 have been eliminated. The pivot rod 71 extends across the intermediate standards 15 and 16 and is welded to the rear faces 15a and 16a.

The foregoing arrangement shifts the location of the pivot rod from its position shown in FIG. 4 a short amount to the rear. To maintain the pivot 71 in the same position as the pivot rod 26 in FIG. 4, the intermediate standards 15 and 16 are located toward the front of the frame.

The pivot means modification just described is less expensive than the arrangement of FIG. 7.

As previously indicated, where the cart is employed for the display and takeout of large beverage bottles such as the three-liter type, the invention contemplates the use of a grid or barrier frame on the front of the tray. Such a grid or frame is indicated at 71 in FIG. 19.

Figure 19:
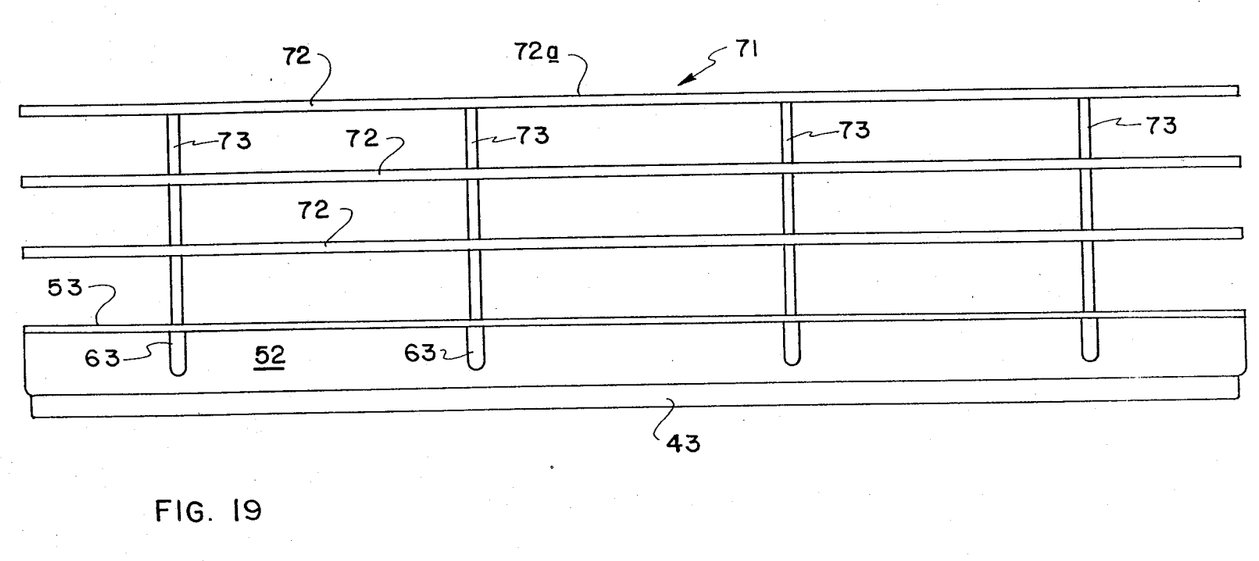
FIG. 19 is a front view of the tray of FIGS. 9, 10 and 11 arranged with a see-thru grid or barrier frame.

The barrier frame 71 is comprised of a plurality of stainless steel horizontal rods 72 and a plurality of stainless steel vertical rods 73. When the rods intersect, the same are spot welded together.

The barrier frame is connected to the front wall of a tray. This is done by providing vertical apertures (not shown) down through the lip 52 and into the bosses 63 which respectively accept the lower ends of vertical rods 71. The rods 71 are preferably adhesively secured in position.

As will be observed, the barrier frame has an open construction and this permits products in the tray to be readily viewed.

The frame is constructed so that the top rod 72a occupies a position with respect to the vertical height of product in the tray to prevent product which is adjacent the wall 52 from tilting and falling out of the tray. The location of the top 72a, of course, is made so that the barrier frame offers no interference to the manual removal of product.

Another important factor in the construction of the barrier frame is that its total weight is such that it will not prevent the tray from tilting between the product load and product take-out positions.

What is claimed is:

1. A product display and take-out cart comprising:
   an upright, open frame;
   a plurality of trays arranged one over the other;
   pivot means supporting and connecting each tray with the frame so as to be tiltable as between a horizontal product load position and an angled product take-out position, the trays being tiltable independent of one another;
   each tray being molded from plastic material; and
   the structure of each tray including a full bottom, vertically oriented, beam-like sections, and metal rod means, the metal rod means being disposed on one side of the tilt axis; and
   the plastic material, the vertical beam-like sections, the metal rod means, and the pivot means all cooperating to minimize tray flexure and the weight distribution provided by the tray structure and the plastic material of the tray which is respectively disposed on opposite sides of the pivot axis causing the tray to tilt to the product load position when the tray is not carrying product and causing the tray to tilt to the product take-out position when the tray has product thereon.

2. A product display and take-out cart comprising:
   an upright, open frame;
   a plurality of trays arranged one over the other with pivot means supporting and connecting each tray with the frame so as to be tiltable as between a horizontal product load position and an angled product take-out position and the trays being tiltable independent of one another;
   each tray being molded from plastic material;
   the structure of each tray including a full bottom, side sections vertically extending upwardly from the bottom, a plurality of sets of vertical ribs which intersect one another to form an integrated grid on the underside of the bottom, and metal rod means, the metal rod means being disposed on one side of the tilt axis; and
   the plastic material, the vertical side sections, the vertical ribs, the metal rod means, and the pivot means all cooperating to minimize tray flexure and the weight distribution provided by the tray structure and the plastic material of the tray which is respectively disposed on opposite sides of the pivot axis causing the tray to tilt to the product load position when the tray is not carrying product and causing the tray to tilt to the product take-out position when the tray has product thereon.

3. A product display and take-out cart comprising:
an upright, open frame;
a plurality of trays arranged one over the other;
pivot means supporting and connecting each tray with the frame so as to be tiltable as between a horizontal product load position and an angled product take-out position and the trays being tiltable independent of one another;
the structure of each tray including vertically oriented, beam-like sections, and weight means, the weight means being disposed on one side of the tilt axis; and
the vertical sections, the weight means, and the pivot means all constructed to cooperate with one another to minimize tray flexure and the weight distribution provided by the tray structure and material of the tray which is respectively disposed on opposite sides of the pivot axis causing the tray to tilt to the product load position when the tray is not carrying product and causing the tray to tilt to the product take-out position when the tray has product thereon.

4. A product display and take-out cart comprising:
an upright, open frame;
a plurality of trays arranged one over the other;
pivot means supporting and connecting each tray with the frame so as to be tiltable as between a horizontal product load position and an angled product take-out position and the trays being tiltable independent of one another;
the structure of each tray including a flat bottom, vertically oriented, beam-like sections respectively extending outwardly from the top side and the underside of the bottom, and weight means, the weight means being disposed on one side of the tilt axis;
the vertical sections, the weight means, and the pivot means all constructed to cooperate with one another to maintain the flat condition of said bottom; and
the weight distribution provided by the tray structure and material of the tray which is respectively disposed on opposite sides of the pivot axis causing the tray to tilt to the product load position when the tray is not carrying product and causing the tray to tilt to the product take-out position when the tray has product thereon.

5. The cart of claim 4 wherein:
said frame includes a pair of upright rear standards, a pair of upright front standards, a pair of intermediate standards disposed between the front and rear standards, base means rigidly connecting said standards together; and
a safety bar connected between the front standards adjacent the tops thereof.

6. The cart of claim 4 further including for at least some of the trays:
an elongated pivot rod extending between said intermediate standards, the respective ends of the rod being welded to the sides of the standards.

7. A mobile, retail store point-of-sale display cart comprising:
a plurality of trays arranged one above the other, each tray being tiltable as between a product load position and a product take-out position wherein the tray is oriented at an angle with respect to the horizontal and each tray to be filled with rows of products while in the product-load position and while in the product take-out position products in the first row to be removed by a customer and each removed product being immediately replaced by a product in the next adjacent row being induced by the angled orientation of the tray to slide down to fill the space;
a frame including wheel means on the underside thereof;
pivot means respectively connecting each said tray with said frame and providing for its tray to tilt about a tilt axis as between said product load position and said product take-out position;
means on said frame to establish said product load position and means on the frame to establish said product take-out position;
each tray being molded from fiberglass reinforced polyester plastic and including:
a full bottom;
a front edge, a rear edge, and a pair of side edges;
the underside of bottom having a first and second sets of vertical ribs, the ribs of the first set extending between the front and rear edges and the ribs of the second set extending between the side edges and intersecting with ribs of the first set;
a pair of ribs in the second set between the said tilt axis and said rear edge each having a metal rod molded therewith to provide weight means;
support means formed on the ribs of said first set for receiving said pivot means to support the tray for said tilting motion;
a vertical front wall extending up from the front edge to be engaged by a row of products stored in the tray;
a pair of vertical product-retaining side walls respectively extending up from the side edges; and
the area above the rear edge being open for loading products into the tray;
for each tray, said pivot means including a pivot rod extending across the tray as between said side edges and connected to said frame and engaging said support means; and
for each tray, retainer means to retain the tray on its pivot rod.

8. The cart of claim 7 wherein:
said frame includes a pair of upright rear standards, a pair of upright front standards, a pair of intermediate standards disposed between the front and rear standards and base means rigidly connecting said standards together; and
said base mounts said wheel means.

9. The cart of claim 8 wherein said means to establish said product load position comprises a plurality of bars extending between and fixedly connected to said rear standards and said means to establish said product take-out position comprises a plurality of bars extending between and fixedly connected to said front standards.

10. The cart of claim 7 wherein the top side of said bottom has a plurality of parallel beads, each bead extending from said rear edge toward said front edge and terminating at a point spaced from the front edge, the beads constituting slides for the products to move toward said front wall when the tray is in the product take-out position.

11. The cart of claim 8 further including for each said tray:
   a pair of latch means respectively pivotally connected to said rear standards and each having an abutment section and a keeper section;
   on each latch means, the weight distribution with respect to its pivot axis providing when the tray is in the product take-out position for the abutment section to engage the outside surface of a vertical side wall and the weight distribution providing when the tray is moved from the product take-out to the product load position for the latch means to swing into the path of tilting motion of the tray wherein the keeper section engages the top edge of said vertical side wall and wherein the abutment means extends over said top edge into the tray, and the keeper section thereby preventing the tray from tilting back into the product take-out position until the abutment is engaged by a product loaded on the tray or by the human hand, the engagement moving the keeper section out of engagement with the top edge to release the tray and as the tray tilts to the product unload position, the abutment section engages the outside surface of said vertical wall.

12. The cart of claim 8 further including for at least each tray above the bottom most tray:
   an elongated pivot rod extending between said intermediate standards, the respective ends of the rod being welded to the standards;
   a strip disposed on the underside of said rod and co-extensive therewith, the opposite ends of said strip being welded to said standards;
   said pivot rod and said strip being formed with a curvature which is concave in a downward direction; and
   a pair of tension rods disposed on opposite sides of said strip and extending between said intermediate standards each rod being welded to the edge of its strip substantially midway of the distance between said standards and opposite ends of each rod respectively being welded to the intermediate standards.

13. The cart of claim 8 further including for the bottom most tray:
   a support rod which has a curvature which is concave in the downward direction, the opposite ends of the support rod being fixed to said base and the support rod engaging the underside of the pivot rod for the bottom most tray.

14. The cart of claim 8 further including for at least some of the trays:
   an elongated pivot rod extending between said intermediate standards, the respective ends of the rod being welded to the sides of the standards.

15. A product display and take-out cart comprising:
   an upright, open frame;
   a plurality of trays arranged one over the other;
   pivot means supporting and connecting each tray with the frame so as to be tiltable as between a horizontal product load position and an angled product take-out position and the trays being tiltable independent of one another;
   the structure of each tray including a bottom including vertically oriented sections and weight means, the weight means being disposed on one side of the tilt axis;
   the vertical sections, the weight means, and the pivot means all constructed to cooperate with one another to minimize tray flexure; and
   the weight distribution provided by the tray structure and material of the tray which is respectively disposed on opposite sides of the pivot axis causing the tray to tilt to the product load position when the tray is not carrying product and causing the tray to tilt to the product take-out position when the tray has product thereon.

16. The cart of claims 1, 2, 3, 4, or 15 wherein the structure of at least one of said trays includes:
   a barrier frame having a top; and
   means connecting said barrier frame to said one tray so as to position the barrier frame adjacent product in the tray when the tray is in the product take-out position;
   the barrier frame having an open construction providing for the product to be viewable thru the frame.
   said top being disposed relative to vertical height of product in the tray to prevent product from tilting and falling out of the tray and the top offering no interference to the manual removal of product; and
   the barrier frame being formed so that its weight is of a value so as not to prevent said tilting between the product load and product take-out positions.

17. The cart of claim 7 further including for at least one of said trays a barrier frame having a top:
   means connecting said barrier frame to said front wall so as to position the barrier frame adjacent product in the tray when the tray is in the product take-out position;
   the barrier frame having an open construction providing for the product to be viewable thru the frame;
   said top being disposed relative to vertical height of product in the tray to prevent product from tilting and falling out of the tray and to offer no interference to the manual removal of product; and
   the barrier frame being formed so that its weight is of a value so as not to prevent the tray tilting between the product load and product take-out positions.

* * * * *